(12) United States Patent
Vrdoljak

(10) Patent No.: US 9,200,739 B2
(45) Date of Patent: Dec. 1, 2015

(54) ADJUSTABLE ATTACHMENT FOR DISPENSING APPARATUS

(75) Inventor: Ognjen Vrdoljak, Laval (CA)

(73) Assignee: Euro-Pro Operating LLC, Newton, MA (US)

( * ) Notice: Subject to any disclaimer, the term of this patent is extended or adjusted under 35 U.S.C. 154(b) by 292 days.

(21) Appl. No.: 13/813,840

(22) PCT Filed: Aug. 3, 2011

(86) PCT No.: PCT/US2011/046448
§ 371 (c)(1),
(2), (4) Date: May 6, 2013

(87) PCT Pub. No.: WO2012/018931
PCT Pub. Date: Feb. 9, 2012

(65) Prior Publication Data
US 2013/0213507 A1   Aug. 22, 2013

Related U.S. Application Data

(60) Provisional application No. 61/370,697, filed on Aug. 4, 2010.

(51) Int. Cl.
*F16K 51/00* (2006.01)
*F16L 41/00* (2006.01)
(Continued)

(52) U.S. Cl.
CPC ............... *F16L 41/00* (2013.01); *A47L 11/34* (2013.01); *B08B 3/026* (2013.01); *B08B 2230/01* (2013.01); *Y10T 137/87571* (2015.04)

(58) Field of Classification Search
CPC ..... B08B 3/026; B08B 2230/01; F16L 41/00; A47L 11/34

USPC ................ 137/205.5, 240, 602, 614.02, 888; 134/94.1, 102.1, 178; 239/8, 310, 318
See application file for complete search history.

(56) References Cited

U.S. PATENT DOCUMENTS 6,935,056 B2   8/2005   Milanese
7,011,234 B2 *  3/2006   Stradella ........................ 222/129
(Continued)

FOREIGN PATENT DOCUMENTS

CN   101618385 A   1/2010
EP   0 567 044 A1   10/1993
(Continued)

OTHER PUBLICATIONS

International Search Report and Written Opinion for PCT/US2011/046448 mailed Feb. 28, 2012.
(Continued)

*Primary Examiner* — Craig Schneider
*Assistant Examiner* — Reinaldo Sanchez-Medina
(74) *Attorney, Agent, or Firm* — Ntellect Law, P.C.

(57) ABSTRACT

A selectively attachable attachment device for a steam appliance is capable of delivering a mixture of steam and a cleaning additive for cleaning surfaces. The attachment device includes a member that can be coupled to a steam source, and a housing configured to receive the member. The member and the housing include complementary tabs and detent(s) such that an adjustable spacing may be maintained between the steam nozzle and the additive nozzle. The adjustable spacing permits control of the rate at which cleaning additive is added to the steam.

6 Claims, 9 Drawing Sheets

(51) Int. Cl.
*A47L 11/34* (2006.01)
*B08B 3/02* (2006.01)

(56) References Cited

U.S. PATENT DOCUMENTS

| | | |
|---|---|---|
| 7,891,047 B2 | 2/2011 | Milanese |
| 8,702,018 B1 * | 4/2014 | Rivera ............ 239/310 |
| 2002/0144374 A1 | 10/2002 | Tsen |
| 2006/0000048 A1 | 1/2006 | Rosenzweig et al. |
| 2008/0066789 A1 | 3/2008 | Rosenzweig et al. |
| 2008/0236635 A1 | 10/2008 | Rosenzweig et al. |
| 2009/0183334 A1 | 7/2009 | Carrubba |
| 2011/0056524 A1 | 3/2011 | Milanese et al. |
| 2011/0073135 A1 | 3/2011 | Breit |
| 2011/0073140 A1 | 3/2011 | Breit |
| 2014/0183280 A1 * | 7/2014 | Mafi et al. ............ 239/318 |

FOREIGN PATENT DOCUMENTS

| | | |
|---|---|---|
| EP | 1 034 733 A1 | 9/2000 |
| KR | 10-2006-0077394 A | 7/2006 |

OTHER PUBLICATIONS

International Preliminary Report on Patentability for PCT/US2011/046448 mailed Feb. 14, 2013.
Office Action from Chinese Application No. 201180048344.4 dated Jun. 26, 2015.

\* cited by examiner

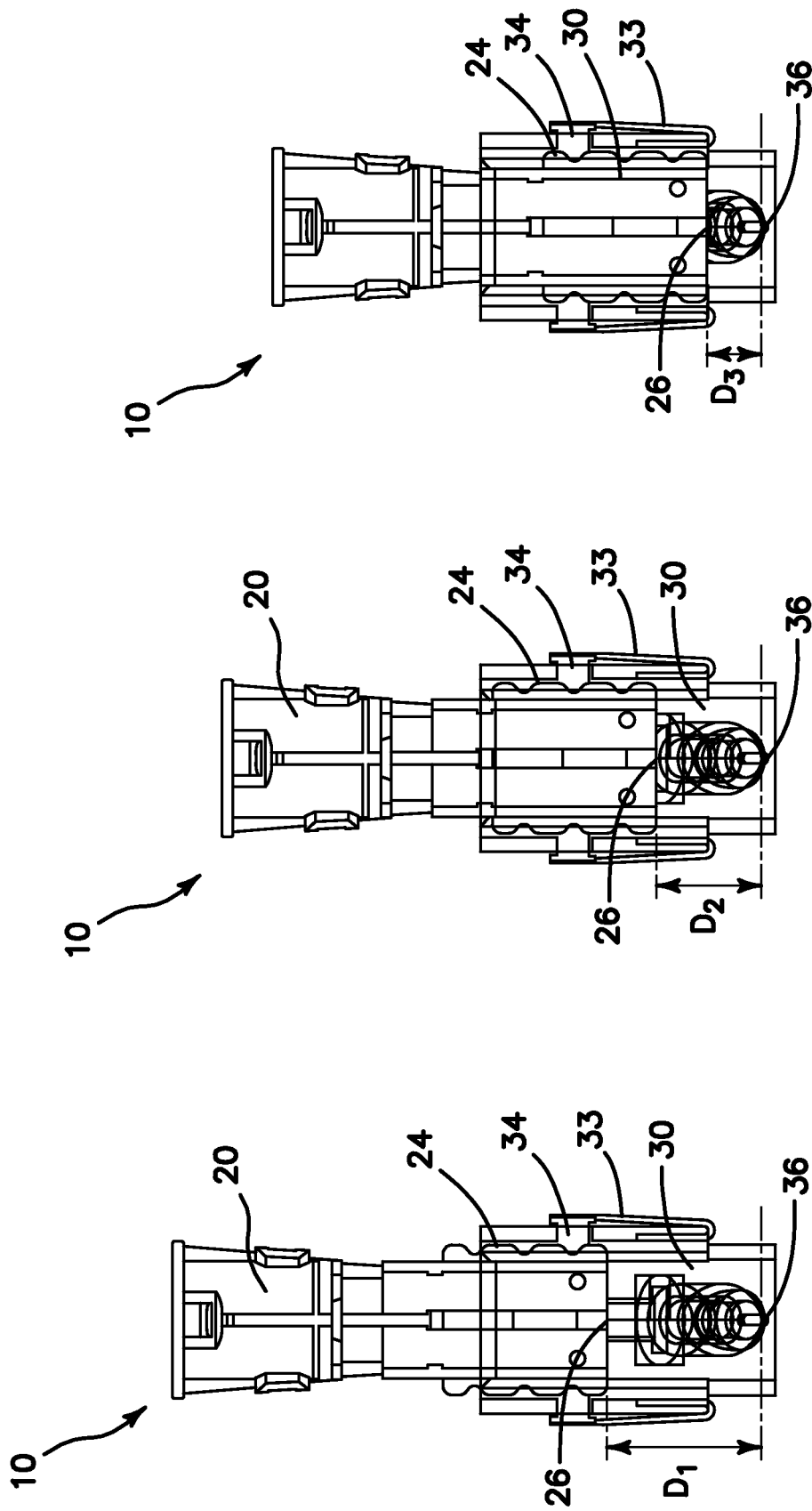

ADJUSTABLE ATTACHMENT FOR DISPENSING APPARATUS

CROSS REFERENCE TO RELATED APPLICATIONS

This application is a national stage filing under 35 U.S.C. §371 of International Application No. PCT/US2011/046448, filed Aug. 3, 2011, entitled "Attachment Device For Dispensing Apparatus", which was published under PCT Article 21(2) in English, and the benefit 35 U.S.C. §119(e) of U.S. Provisional Application No. 61/370,697, filed Aug. 4, 2010, entitled "Adjustable Attachment For Dispensing Apparatus", the entire contents of which are incorporated herein by reference.

DISCUSSION OF RELATED ART

Steam appliances are used in the home to apply steam to floors and other surfaces for cleaning and sanitizing. Various types of steam appliances are known including steam mops, handheld steam appliances and canister steam appliances, for example. Handheld steam appliances often include a container and a nozzle for discharging steam from the container. In some instances, a conduit may be used to guide the discharged steam. Canister steam appliances typically include a steam generation unit, a conduit to transfer steam from the steam generation unit, and a steam applicator to facilitate application of steam to surfaces to be cleaned.

SUMMARY

According to one embodiment, an attachment device for a steam appliance is capable of delivering a mixture of steam and an additive for cleaning purposes. The attachment device includes a member that can be coupled to a steam source, and a housing configured to receive the member. The member and the housing include a complementary tab and a detent such that a predetermined spacing may be maintained between a steam nozzle and an additive nozzle. The predetermined spacing may allow adjustment and/or control of the amount of additive to be mixed and dispensed with the steam.

In one embodiment, an attachment device for a steam appliance includes a member having a first tab, a second tab adjacent the first tab, an inlet configured to receive steam from the steam appliance, and a first pathway in fluid communication with the inlet. The attachment device also includes a housing configured to receive the member. The housing includes a chamber that is in fluid communication with the first pathway, and a detent configured to receive the first and second tabs. The attachment device further includes a reservoir in fluid communication with the chamber via a second pathway. The reservoir is configured to store an additive.

In operation, when the detent receives the first tab, a first amount of the additive can be drawn into the chamber as steam passes through the chamber. In the alternative, when the detent receives the second tab, a second, a second amount of the additive can be drawn into the chamber as steam passes through the chamber. The second amount of additive is different than the first amount of additive. For example, the second amount may be greater than the first amount.

In one embodiment, vents may be formed about portions of the member to mitigate turbulence inside the chamber. In another embodiment, the member may include a third tab and the detent may be configured to receive the third tab. In operation, when the detent receives the third tab, a third amount of additive may be drawn into the chamber as steam passes through the chamber, the third amount being different than the first amount and the second amount.

In some embodiments, the additive may be at least one of disinfectant cleaner, bleach solution, antimicrobial solution, sanitizing solution, cleaning solution or combinations thereof. In other embodiments, the attachment device may be provided in combination with a steam appliance such as a handheld steam unit.

In one embodiment, an attachment device for a steam appliance includes a body having an outlet, a chamber adjacent the outlet, and an inlet in fluid communication with the chamber via a first pathway. In this instance, the inlet may be configured to receive a first substance from the steam appliance. The attachment device includes a reservoir in fluid communication with the chamber via a second pathway. The reservoir may be configured to store a second substance.

In operation, as the first substance enters the chamber, a reduced pressure in the chamber may draw the second substance into the chamber so as to discharge a third substance via the outlet. The third substance may be a mixture of the first substance and the second substance.

In one embodiment, the steam appliance may be coupled to the inlet via a first latch while the reservoir can be coupled to the body via a second latch. The first latch may be actuable by a first release button while the second latch may be actuable by a second release button. In another embodiment, the steam appliance may be coupled to the inlet via a mechanical latch actuable by a release button while the reservoir may be coupled to the body via a threaded connection.

The first substance may be at least one of liquid, water, air, steam, gas, slurry, fluidic material or combinations thereof. The second substance may be at least one of disinfectant cleaner, bleach solution, antimicrobial solution, sanitizing solution, cleaning solution or combinations thereof.

In one embodiment, an aperture may be formed on the body, the aperture being in fluid communication with the reservoir so as to prevent the reservoir from collapsing as the second substance is drawn into the chamber. In another embodiment, the attachment device may be provided in combination with a steam appliance such as a handheld steam unit.

In one embodiment, a steam appliance includes a body having a steam generation unit, a steam conduit attachable to the body for guiding steam from the steam generation unit, and a steam applicator attachable to the steam conduit, the steam applicator being substantially similar to that of a steam attachment device as described above.

In one embodiment, the steam applicator includes a body having an outlet, a chamber adjacent the outlet, and an inlet in fluid communication with the chamber via a first pathway. In this instance, the inlet may be configured to receive a steam from the steam generator via the steam conduit. The steam applicator includes a reservoir in fluid communication with the chamber via a second pathway. The reservoir may be configured to store an additive.

In operation, as steam passes through the chamber, a reduced pressure in the chamber is capable of drawing the additive into the chamber so as to discharge a composition via the outlet. The composition includes a mixture of steam and the additive. The additive may be at least one of disinfectant cleaner, bleach solution, antimicrobial solution, sanitizing solution, cleaning solution or combinations thereof.

In one embodiment, the steam conduit may be connectable to the inlet via a first latch while the reservoir may be connectable to the steam applicator via a second latch. Like above, the first latch may be actuable by a first release button while the second latch may be actuable by a second release button. In the alternative, the steam conduit may be connectable to the inlet via a mechanical latch, while the reservoir may be connectable to the steam applicator via a threaded connection.

In one embodiment, an aperture may be formed on the body, the aperture being in fluid communication with the reservoir so as to prevent the reservoir from collapsing as the additive is drawn into the chamber by the steam.

Other variations, embodiments and features of the present disclosure may become more evident from the following detailed description and drawings.

BRIEF DESCRIPTION OF THE DRAWINGS

The accompanying drawings are not intended to be drawn to scale. For purposes of clarity, not every component may be labeled in every drawing. In the drawings:

FIGS. 5A-5C are schematic views of three different configurations of the attachment device of FIG. 1.

DETAILED DESCRIPTION

It will be appreciated by those of ordinary skill in the art that the disclosure can be embodied in other specific forms without departing from the spirit or essential character thereof. The presently disclosed embodiments are therefore considered in all respects to be illustrative and not restrictive.

Figure 1:
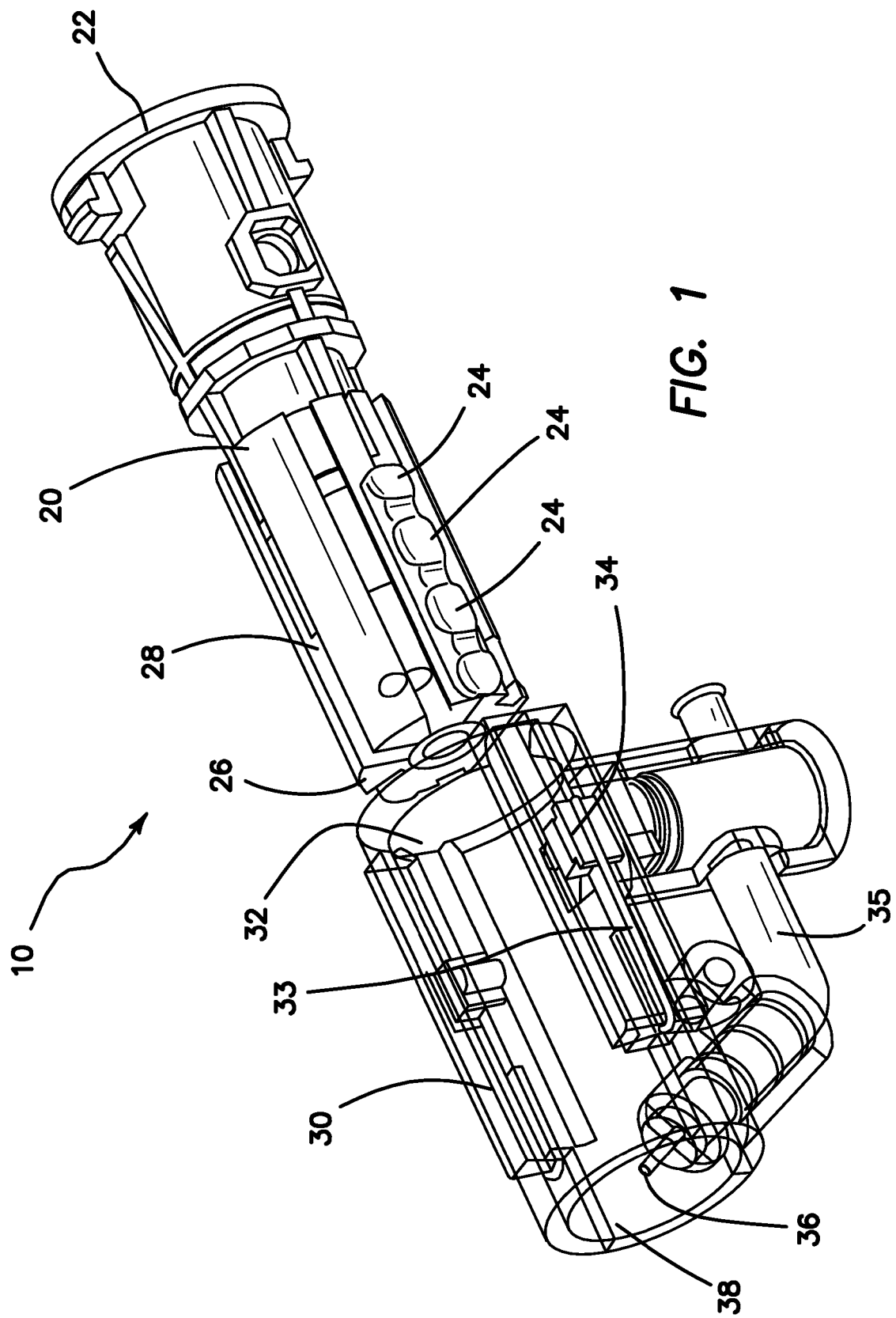
FIG. 1 is a schematic view of an attachment device according to one embodiment of the present disclosure.

Reference is now made to FIG. 1 showing a schematic view of an attachment device 10 according to one embodiment of the present disclosure. The attachment device 10 may be used in combination with a dispensing apparatus or a steam appliance. The dispensing apparatus may be a liquid dispensing unit similar to that disclosed in U.S. Patent Application No. 2006/0000048, filed Jul. 2, 2004, which is incorporated herein by reference in its entirety. The attachment device 10 may be attached or connected to the dispensing apparatus or the steam appliance via a steam hose, conduit or connector.

In some embodiments, the dispensing apparatus may be a steam mop similar to that disclosed in U.S. Patent Application Nos. 2008/0236635 and 2008/0066789, both filed Jun. 27, 2007, each of which is incorporated herein by reference in its entirety. In these instances, the attachment device 10 may be attached or connected to the body or handle of the steam mop.

In one embodiment, the attachment device 10 includes a member 20 capable of coupling to a housing 30. In some embodiments, the housing 30 may be configured to receive the member 20. Although the member 20 and the housing 30 are to have corresponding body portions that may be substantially cylindrical, it will be appreciated by one skilled in the art that the member 20 and the housing 30 may be other suitable shapes including polygonal shapes, and be any suitable size.

In one embodiment, the member 20 includes an inlet 22 which can be in fluid communication with a source (not shown) capable of providing steam. The steam source may be provided by a dispensing apparatus or a steam appliance as described above including steam canister, handheld steam unit, handheld steam dispenser or steam mop, for example.

A plurality of tabs 24 may be formed about an exterior portion of the body of the member 22 for engagement with the housing 30. This will become more apparent in subsequent figures and discussion.

In one embodiment, the member 20 includes an outlet 26 capable of relaying steam from the inlet 22. In some instances, the outlet 26 also may be referred to as a steam nozzle. The steam nozzle 26 and the inlet 22 may be in fluid communication via a central pathway through the body of the member 22.

In one embodiment, a plurality of vents 28 may be formed about portions of the body of the member 20 to mitigate steam turbulence. For example, the vents 28 may help to keep the flow of steam steady from the inlet 22, through the central pathway, and out the steam nozzle 26. In some instances, the vents 28 may also keep the flow of steam steady from the steam nozzle 26 as steam is mixed with an additive from an additive nozzle 36. This will become more apparent in subsequent figures and discussion.

The housing 30 includes a chamber 32 for receiving the body portion of the member 20. The chamber 32 may be dimensioned accordingly to complement the body portion of the member 20. Like the steam nozzle 26 and the inlet 22, the chamber 32 also may be in fluid communication with the central pathway as the body portion of the member 20 is received by and in some instances within the chamber 32 of the housing 30.

In some embodiments, the interior portion of the chamber 32 may include a stopper or detent 34 for receiving at least one of the tabs 24 of the member 20. For example, as the housing 30 receives the member 20, one or more tabs 24, in series, may be received by the detent 34. For example, a first tab 24 closest to the steam nozzle 26 may be initially received and secured by the detent 34. Continued insertion of the member 20 with respect to the housing 30 may drive a second tab 24, adjacent the first tab 24, to be received and secured by the detent 34. Further insertion of the member 20 may cause a third tab 24, adjacent the second tab 24, to be received and secured by the detent 34. As can be appreciated by one skilled in the art, there can be as many or as few tabs 24 as desired.

In the alternative, instead of a detent 34, the interior portion of the chamber 32 of the housing 30 may include a recess or a series of recesses 34 (not shown) to complement the tabs 24. For example, a first tab 24 may be received by a first recess 34 while a second tab 24 may be received by a second recess 34. Although four tabs 24 are shown in FIG. 1, it will be appreciated by one skilled in the art that there can be as many or as few tabs 34 as desired depending on the amount of additive control required. In some embodiments, the tab/recess may function as slides or guides for aligning the member 20 to the housing 30. In other embodiments, a spring 33 may be incorporated to further secure the tab 24 to the recess 34.

Figure 2:
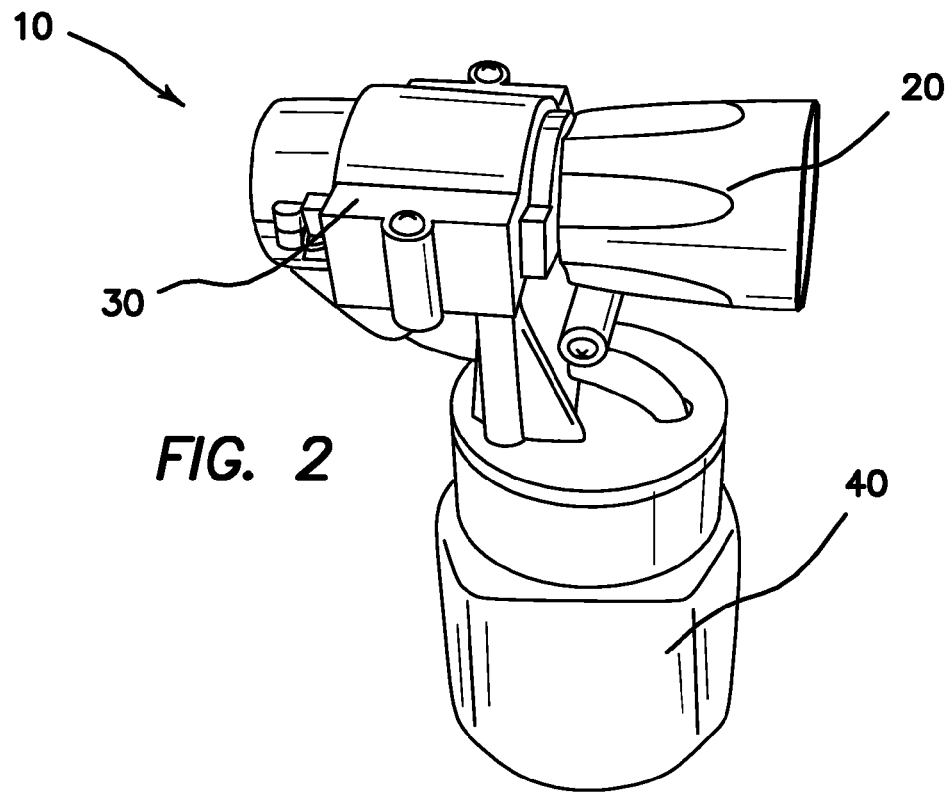
FIG. 2 is a perspective view of an attachment device according to one embodiment of the present disclosure.
Figure 3:
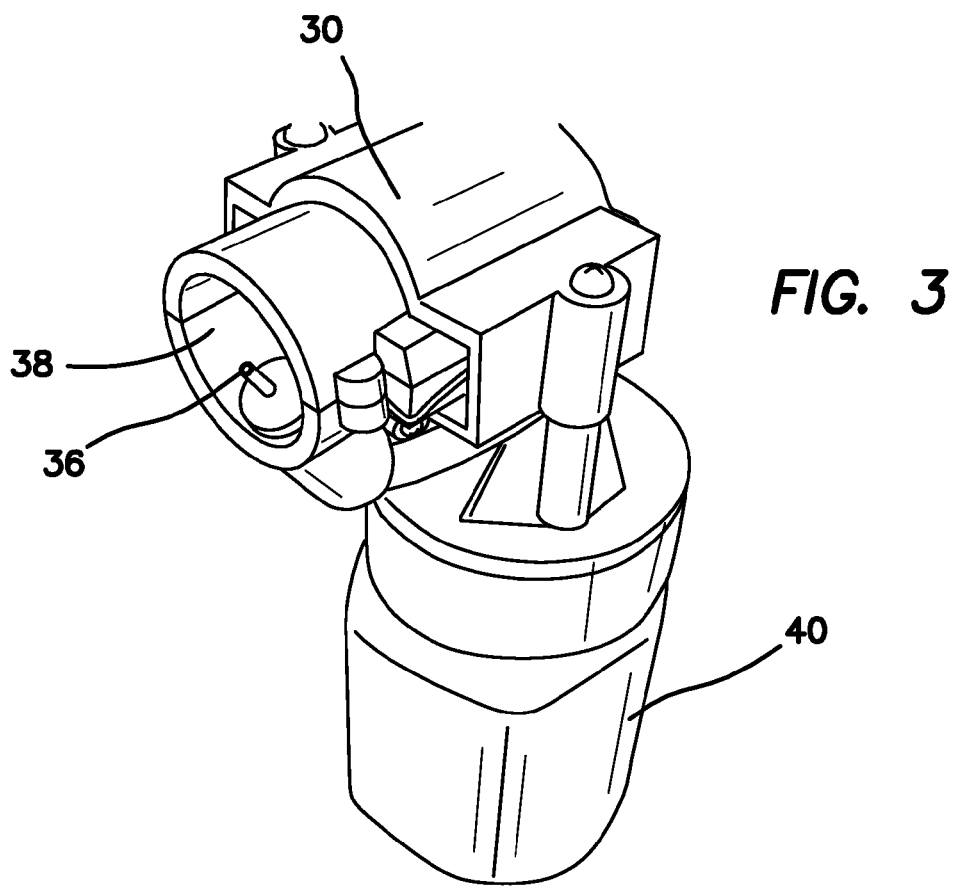
FIG. 3 is a perspective view of the attachment device of FIG. 2 without a member section.

In one embodiment, the housing 30 includes an inlet 36 which may be configured to be in fluid communication with a reservoir 40 (best shown in FIGS. 2-3). The reservoir 40 may be capable of storing and providing an additive to the chamber 32 via a conduit 35. In some instances, the inlet 36 may also be referred to as an additive nozzle while the conduit 35 may be referred to as a fluid pathway. The conduit 35 provides fluid communication between the reservoir 40 and the chamber 32 of the housing 30. The additive may be stored within the reservoir 40 for mixing with steam and may include a disinfectant, bleach, or other suitable cleaning materials or solutions.

In one embodiment, the attachment device 10 includes the member 20, the housing 30 and the reservoir 40. When the attachment device 10 is coupled to the steam appliance, the first tab 24 of the member 20 may engage the detent 34 of the housing 30. When steam from the steam appliance is discharged from the steam nozzle 26 via the inlet 22, additive from the reservoir 40 may be drawn up the conduit 35 for mixing with steam in or proximate the chamber 32. The mixture of steam and additive may be discharged through a chamber outlet 38.

The amount of additive from the additive nozzle 36 that can be mixed with steam from the steam nozzle 26 may depend on the spacing between the two nozzles 26, 36. In operation, the first tab 24 is capable of drawing a first amount of additive while the second tab 24 is capable of drawing a second amount of additives. In these instances, the second amount of additive is different from the first amount of additive. For example, the second mixture of steam and the second amount of additive may be greater than the first mixture of steam and the first amount of additive because the second tab 24 provides for a shorter distance of travel between the steam nozzle 26 and the additive nozzle 36 than that of the first tab 24. This will become more apparent in subsequent figures and discussion.

While the embodiment shown in FIG. 1 includes tabs on the member 20 and detents on the housing 30, in some embodiments tabs may be positioned on the member 20 and detents on the housing 30.

Reference is now made to FIG. 2 showing a perspective view of an attachment device 10 according to one embodiment of the present disclosure. The attachment device 10 includes a housing 30 configured to receive a member 20. The coupling mechanism for the member 20 and the housing 30 may be substantially similar to those described above with reference to FIG. 1. The attachment device 10 also includes a reservoir 40, which may be capable of providing an additive for mixing with steam from a steam dispensing apparatus.

Reference is now made to FIG. 3 showing a perspective view of the attachment device 10 of FIG. 2 without the member portion 20. The additive nozzle 36, may be in fluid communication with the reservoir 40 via a pathway similar to that described above. In operation, the additive contained within the reservoir 40 additive nozzle 36 may be drawn into the chamber, thereby mixing the additive and steam and delivering the mixture via the chamber outlet 38 for purposes of cleaning or disinfecting a surface.

Figure 4A:
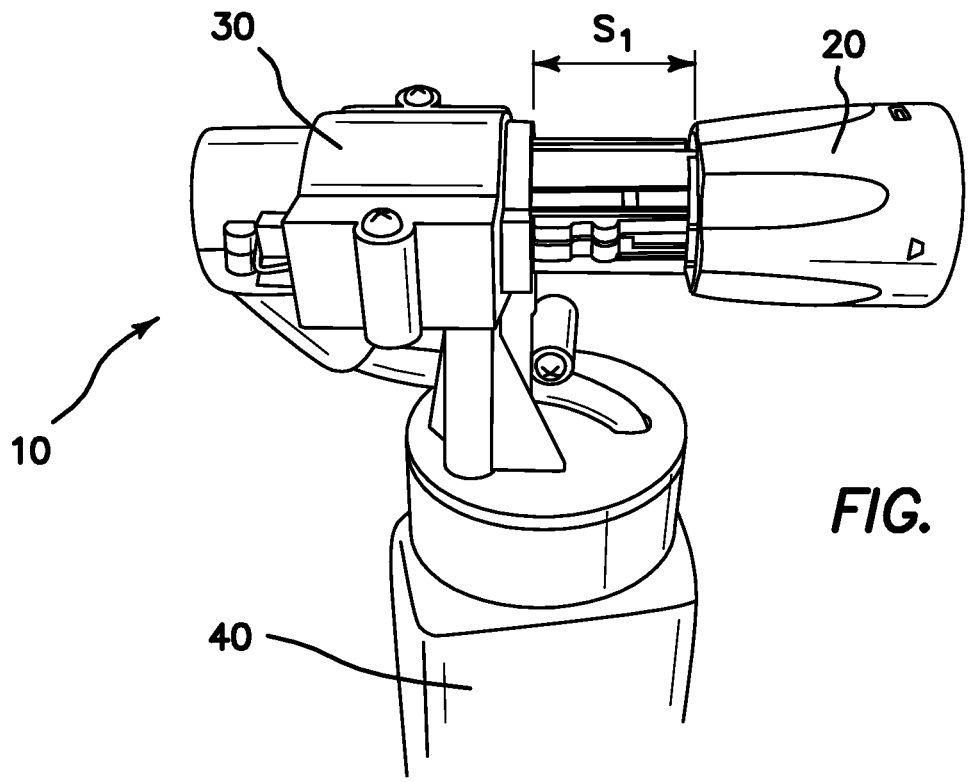
FIGS. 4A-4B are side perspective views of two different configurations of the attachment device of FIG. 2.
Figure 4B:
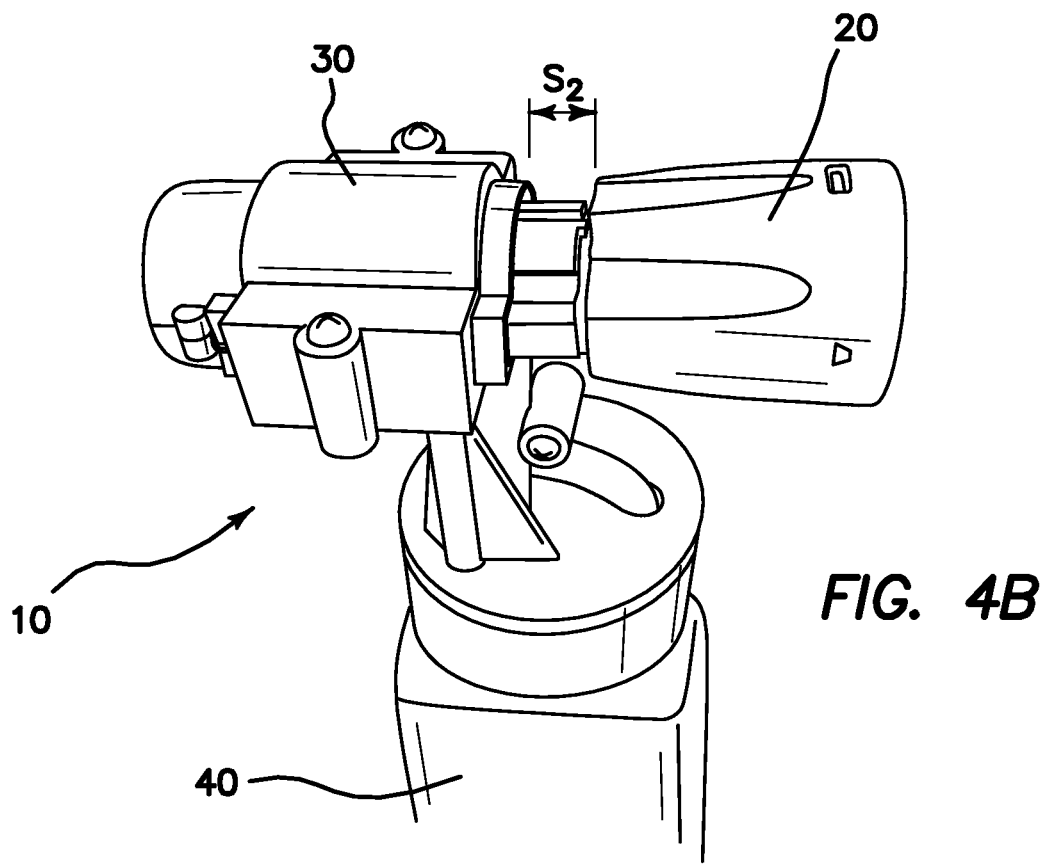

Reference is now made to FIGS. 4A-4B showing side perspective views of two different configurations of the attachment device 10 of FIG. 2.

In FIG. 4A, a portion of the member 20 may be received within the housing 30 such that a spacing of S1 may be maintained between the inlet 22 of the member 20 and the chamber 32 of the housing 30. In this instance, a first tab 24 of the member 20 may be engaged with a detent 34 of the housing 30 such that the distance from the steam nozzle 26 to the additive nozzle 36 may be relatively far. For example, the spacing S1 may be about less than or about 20 mm, or less than about 15 mm, or less than about 10 mm.

In FIG. 4B, the member 20 may be further actuated within the housing 30 such that a spacing of S2 may be maintained between the inlet 22 of the member 20 and the chamber 32 of the housing 30, the spacing S2 being shorter than the spacing S1. In this instance, a second tab 24 of the member 20 may be engaged with the detent 34 of the housing 30. For example, the spacing S2 may be about less than or about 8 mm, or less than about 6 mm, or less than about 4 mm, or less than about 2 mm.

In some embodiments, the diameter of the steam nozzle 26 may be in the range of from about 1 mm to about 4 mm, while the diameter of the additive nozzle 36 may be in the range of from about 0.1 mm to about 3 mm. In other embodiments, the diameter of the steam nozzle 26 may be in the range of from about 2 mm to about 3 mm, while the diameter of the additive nozzle 36 may be in the range of from about 0.5 mm to about 1.5 mm. In one embodiment, the diameter of the steam nozzle 26 may be about 2.5 mm while the diameter of the additive nozzle 36 may be about 1 mm.

Reference is now made to FIGS. 5A-5C showing schematic top views of three different configurations of the attachment device 10 of FIG. 1 to further illustrate the adjustable spacing as discussed above.

In the embodiment illustrated in FIG. 5A, which is substantially similar to the embodiment illustrated in FIG. 4A, a first tab 24a of the member 20 may be engaged with a detent 34 of the housing 30. The tab 24a may be further secured to the detent 34 via the use of a spring 33. Once coupled, a spacing D1 between the steam nozzle 26 and the additive nozzle 36 may be established such that a predetermined amount of additive may be entrained from the additive nozzle 36 and mixed with steam from the steam nozzle 26 to provide a mixture of additive and steam.

Similarly, a second tab 24b may be engaged as shown in FIG. 5B and a third tab 24c may be engaged as shown in FIG. 5C to provide two additional spacing values D2, D3 between the steam nozzle 26 and the additive nozzle 36. In these configurations, spacing D1 may be greater than spacing D2, which may be greater than spacing D3.

In some embodiments, actuation of the member 20 may be carried out manually by pushing the member 20 forward with respect to the housing 30 or pulling the member 20 backward from the housing 30 for engaging or disengaging the tabs 24 within the detent 34. In other embodiments, actuation of the member 20 with respect to the housing 30 for engaging or disengaging the tabs may be carried out by other suitable mechanical techniques and/or in an electrically powered manner.

In some embodiments, the spacing between the steam nozzle 26 and the additive nozzle 36 may be in the range of from about 0 mm to about 50 mm. In other embodiments, the spacing between the steam nozzle 26 and the additive nozzle 36 may be in the range of from about 5 mm to about 30 mm. In one embodiment, spacing D1 may be at about 26 mm, spacing D2 may be at about 18 mm, while spacing D3 may be at about 10 mm.

In some embodiments, the flow rate of the additive being delivered to the chamber 38 from the additive nozzle 36 may be in the range of from about 5 grams per minute to about 30 grams per minute, while the flow rate of steam being delivered from the steam nozzle 26 may be fixed at about 25 grams per minute. Within a period of five minutes, the flow rate of the additive nozzle 36 may be at about 9 grams per minute (FIG. 5A), or at about 15 grams per minute (FIG. 5B) or at about 21 grams per minute (FIG. 5C), with an error of ±1.5 grams per minute depending on the discharging frequency, among other variables.

In short, the attachment device 10 may be capable of providing different additive flow rates from the additive nozzle 36 while the steam flow rate from the steam nozzle 26 may remain constant. Embodiments of the attachment device 10 as disclosed herein may provide different mixtures of steam and additive using only mechanical components, that is, without the use of complex electronics or electrical components. By permitting adjustment of the additive flow rate, the user may adjust the cleaning capability of the appliance based on the particular cleaning requirements. For example, the additive flow rate may be adjusted in response to the type of a stain, the size of a stain, the type of material stained, etc. In some embodiments, the amount or flow rate of the additive may be predetermined by adjusting the attachment device 10 prior to actuating or dispensing steam from a steam dispensing appliance such as a handheld steam unit. Of course, in some embodiments, an electrically powered pump or other electrical component may be used to deliver additive to the chamber 38.

Figure 6:
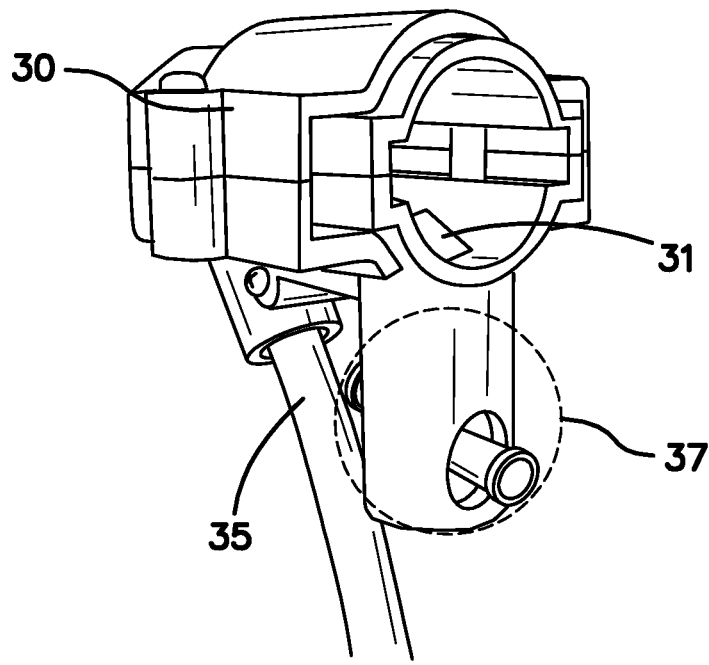
FIG. 6 is a rear perspective view of the housing portion of the attachment device of FIG. 2.

Reference is now made to FIG. 6 showing a rear view of the housing portion 30 of the attachment device 10 of FIG. 2. In this example, the interior of the chamber of the housing 30 includes a ramp 31 which may be actuated by engagement of the member 20 to the housing 30. In doing so, the ramp 31 may actuate a valve assembly 37 which may serve as a mechanism for opening/closing access to the additive within the reservoir 40. This will become more apparent in subsequent figures and discussion.

Figure 7A:
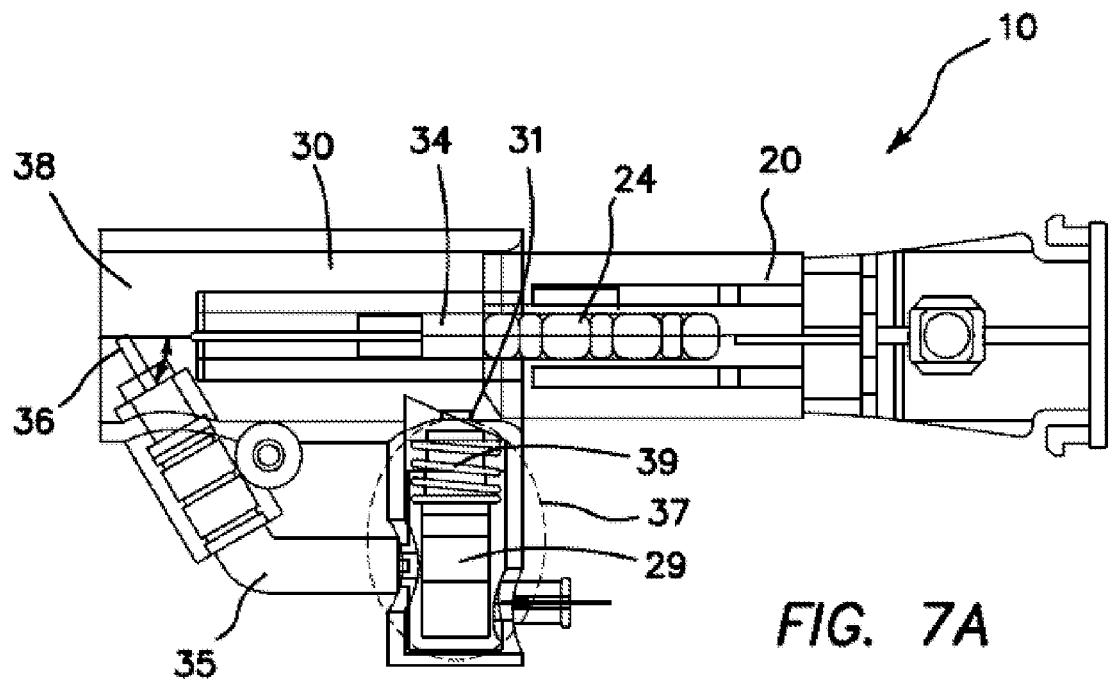
FIGS. 7A-7B are schematic views of two different configurations of an attachment device according to one embodiment of the present disclosure.
Figure 7B:
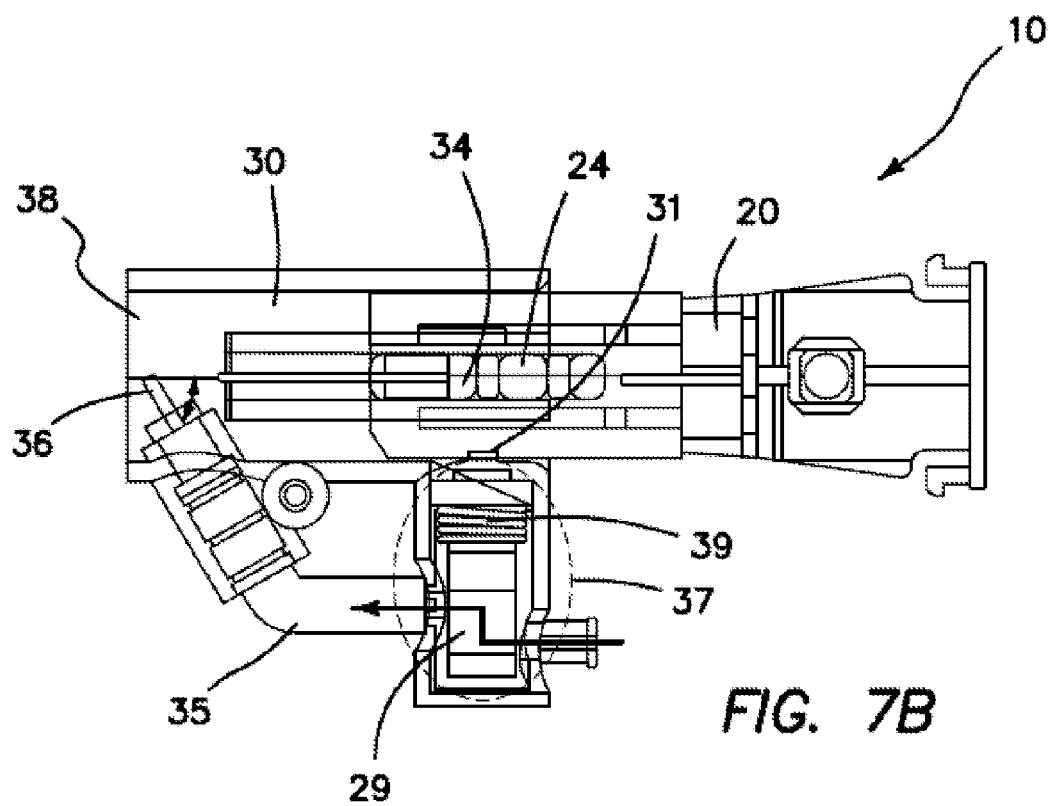

Reference is now made to FIGS. 7A-7B showing schematic views of two different configurations of an attachment device 10 according to one embodiment of the present disclosure.

FIG. 7A shows a closed position wherein the member 20 is substantially disengaged from the housing 30 and no tabs 24 are engaged by the detent 34. In this instance, the ramp 31 has not been triggered and a fluid passage 29 is not in fluid communication with a pathway to the additive reservoir. When ramp 31 is triggered, fluid passage 29 is moved and/or expanded such that the fluid passage 29 is in fluid communication with both the pathway to the additive reservoir and the pathway conduit 35. In this configuration, additive can flow to chamber 38. In some embodiments, a piston valve assembly 37 including a spring 39 may be used to move fluid passage 29 in response to movement of ramp 31.

FIG. 7B shows an open position whereby the member 20 is substantially engaged with the housing 30 and at least one tab 24 is secured by the detent 34. In this position, the body of the member 20, upon engagement of the tab 24 to the detent 34, mechanically actuates the ramp 31, thereby engaging the spring 39. When the spring 39 is compressed or pressed downward by actuation of the member 20 within the housing 30, the compression causes the piston 29 to be pushed downward thereby allowing fluid communication to take place between the reservoir 40 and the steam nozzle 36 via the pathway conduit 35 as illustrated by the arrow. Consequently, additive contained within the reservoir 40 may be drawn through the additive nozzle 36 and mixed with steam from the steam nozzle 26 due to the Venturi effect.

Although the additive nozzle 36 as shown may be substantially centered and in front with respect to the steam nozzle 26, it will be appreciated by one skilled in the art that the additive nozzle 36 may be situated off center from the steam nozzle 26. For example, the additive nozzle 36 may be positioned on the bottom of the chamber 38, the top of the chamber 38, or anywhere about the sides of the chamber 38.

In some embodiments, the additive nozzle 36 may be offset at an angle with respect to the steam nozzle 26. For example, the angle between the steam nozzle 26 and the additive nozzle 36 may be in the range of from about 0 degrees to about 90 degrees. In other embodiments, the angle between the steam nozzle 26 and the additive nozzle 36 may be in the range of from about 15 degrees to about 75 degrees. In one embodiment, the angle between the steam nozzle 26 and the additive nozzle 36 may be at about 30 degrees.

Figure 8:
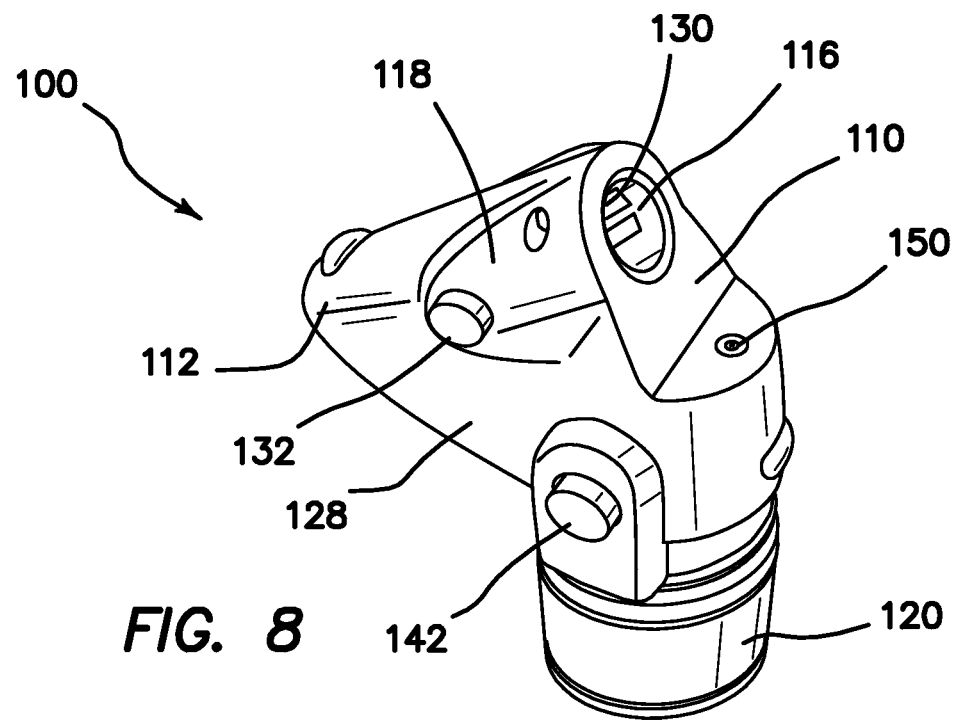
FIGS. 8-10 are perspective views of an attachment device according to one embodiment of the present disclosure.
Figure 9:
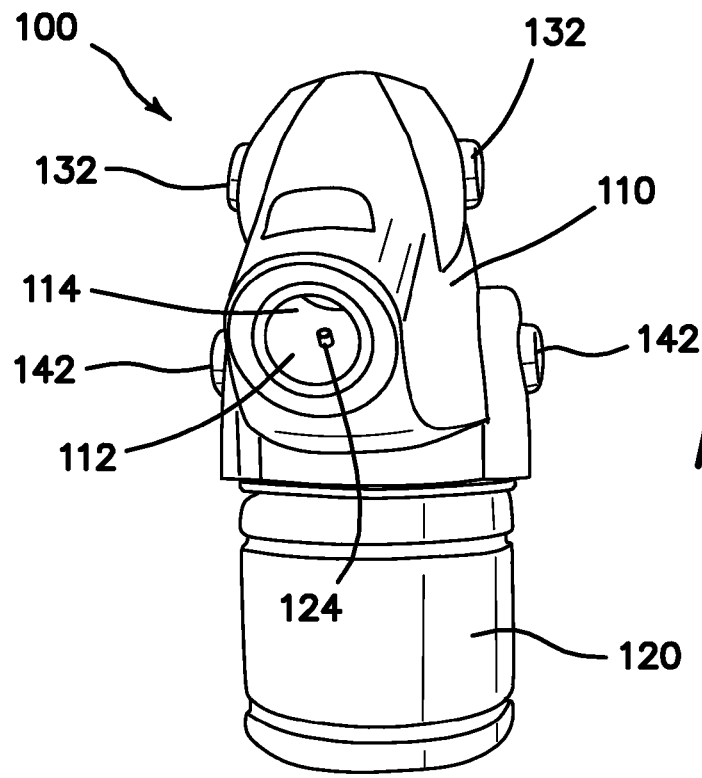
Figure 10:
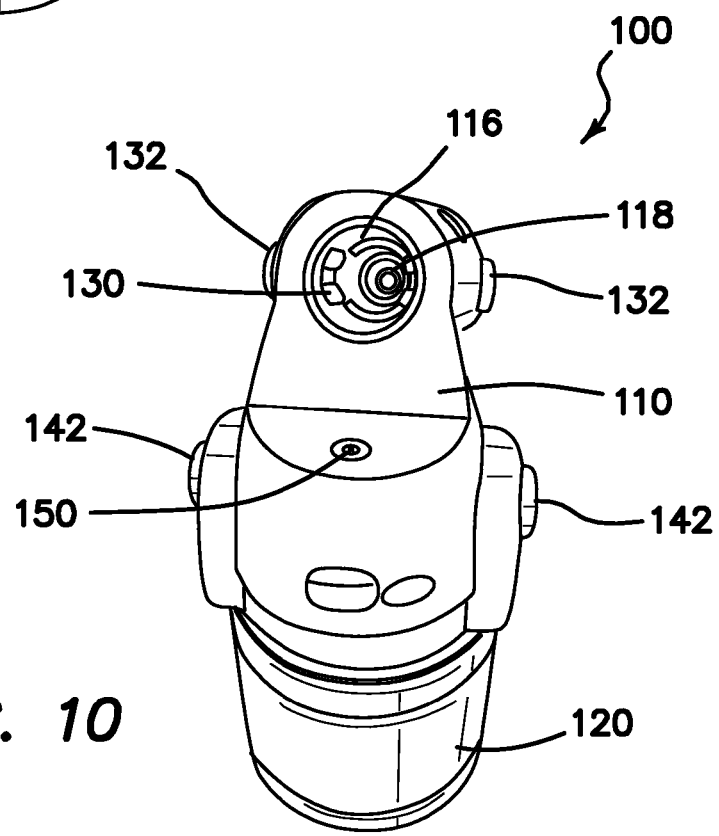

Reference is now made to FIGS. 8-10 showing perspective views of an attachment device 100 according to one embodiment of the present disclosure. The attachment device 100 includes a body 110 having an outlet 112. A chamber 114 (see FIG. 9) may be located substantially adjacent the outlet 112. The chamber 114 may allow for mixing of different substances while the outlet 112 may allow for the mixture to be discharged.

In one embodiment, the body 110 includes an inlet 116, which may be in fluid communication with the chamber 114 via a first pathway 118. The first pathway 118 may extend from the inlet 116 of the body 110, through a narrowing corridor 118 within the body 110 (as best seen in FIG. 10), and out to the chamber 114. The inlet 116 may be capable of receiving a first substance from a steam appliance. In some embodiments, the first substance includes at least one of liquid, water, air, steam, gas, slurry, fluidic material or combinations thereof. In one embodiment, the inlet 116 may be capable of receiving steam from a steam appliance. In operation, steam may be relayed from the inlet 116 to the chamber 114 via the first pathway 118.

In one embodiment, the attachment device 100 includes a reservoir 120, which may be in fluid communication with the chamber 114 via a second pathway 128. The relationship of the reservoir 120, second pathway 128 and the chamber 114 will be described in more detail in subsequent figures and discussion.

In one embodiment, the reservoir 120 may be configured to store a second substance. In some embodiments, the second substance includes at least one of disinfectant cleaner, bleach solution, antimicrobial solution, sanitizing solution, cleaning solution or combinations thereof. In other embodiments, the second substance may be a composition that is suitable at destroying a wide variety of bacteria, yeasts, fungi, spores, mold and mildew, among other viruses and microbes.

In operation, as the first substance enters the chamber 114 through the first pathway 118, suction pressure may be generated in the chamber 114 via the Venturi effect. As the first substance enters the inlet 116 with relatively high pressure, the pressure energy is converted to kinetic energy in the form of higher velocity as it enters the narrowing corridor of the first pathway 118. The higher velocity is accompanied by lower pressure, which draws or entrains materials into the chamber 114. In one embodiment, the materials being drawn into the chamber 114 by the suction pressure generated may be that of the second substance. The second substance may be drawn into the chamber 114 from the reservoir 120 via the second pathway 128.

As the first substance and the second substance come together in the chamber 114, mixing of the two substances may occur to produce a third substance, which includes a mixture of the first substance and the second substance. The third substance may subsequently be discharged from the chamber 114 out to a surface to be cleaned via the outlet 112.

In one embodiment, the steam appliance that is coupled to the attachment device 100 is a handheld steam unit. The steam appliance may include a steam conduit with corresponding connector portion for coupling to the attachment device 100 of the present disclosure. The steam appliance, steam conduit and connector may be similar to those disclosed in U.S. Published Patent Application Nos. 2011/0073140 and 2011/0073135, both filed Sep. 25, 2009, each of which is incorporated by reference in its entirety.

In one embodiment, the steam appliance may be coupled to the inlet 116 via a mechanical catch or latch 130, the steam appliance having a corresponding connector portion. The latch 130 may be actuated via a pair of release buttons 132. Other fastening techniques may be utilized including friction latch or rotating latch, among others.

In some embodiments, the steam appliance may be coupled to the inlet 116 or to the outlet 112. For example, the steam appliance may include a corresponding connector or hose which may be coupled to the inlet 116. The mixing occurs in the attachment device 100 and the mixture is discharged via the outlet 112. In the alternative, the steam connector or hose may be coupled to the outlet 112. In this case, the mixing would still take place in the attachment device 100, and the mixture would be discharged from the outlet 112. However, the mixture may be directed to a desired treatment area by the steam connector or hose, thus providing additional flexibility.

In one embodiment, an aperture 150 may be formed within a portion of the body 110 as shown in FIGS. 8 and 10. The aperture 150 may be in fluid communication with the reservoir 120 to provide an air intake port. By providing aperture 150, a vacuum pressure does not build up in the reservoir, which could cause the reservoir 120 to collapse. The fluid communication between the aperture 150 and the reservoir 120 will be discussed in more detail in subsequent figures and discussion.

Figure 11:
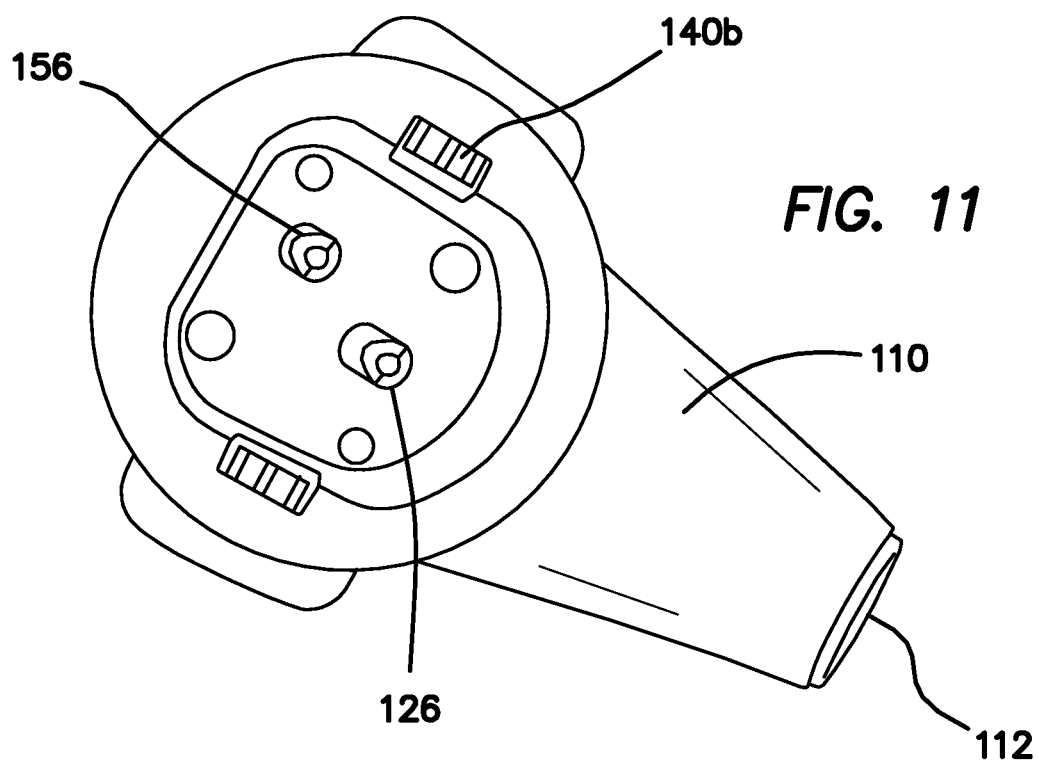
FIGS. 11-12 are perspective views of the body and the reservoir, respectively, of the attachment device of FIGS. 8-10.
Figure 12:
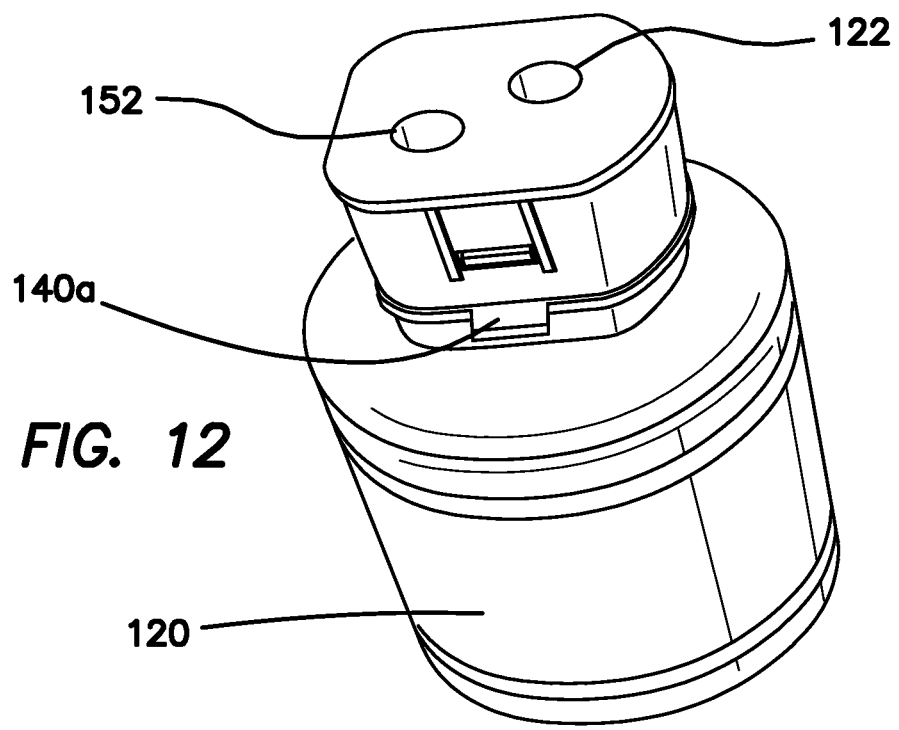

Reference is now made to FIGS. 11-12 showing views of the body 110 and the reservoir 120, respectively, of the attachment device of FIGS. 8-10. Like the embodiment describe above with reference to FIGS. 8-10, the reservoir 120 may be coupled to the body 110 via a mechanical latch 140. This mechanical latch 140 may include an extension tab 140*a* on the reservoir 120 and a corresponding catch 140*b* on the body 110. Alternatively, the tab 140*a* may be formed on the body 110 while the catch 140*b* may be formed on the reservoir 120. The tab 140*a* and catch 140*b* also may be located at different portions of the body 110 and the reservoir 120. In some instances, other suitable mechanical latching mechanisms may be utilized. In other embodiments, other fastening mechanisms such as a friction latch or a rotating latch, among others, may be incorporated. Similar to the first catch or latch 130, the second catch or latch 140 may also be actuated via a pair of release buttons 142 as best seen in FIGS. 8-10.

In one embodiment, the reservoir 120 may be selectively attachable to and detachable from body 110.

In one embodiment, the body 110 includes a pair of tube-like extensions 126, 156. The tube-like extensions 126, 156 may be configured to be received by a corresponding pair of recesses 122, 152 in the reservoir 120. For example, the first extension 126 may be received by the first recess 122 while the second extension 156 may be received by the second recess 152. In operation, coupling of the first extension 126 and the first recess 122 allows fluid communication between the body 110 and the reservoir 120. Likewise, coupling of the second extension 156 and the second recess 152 allows fluid communication between the body 110 and the reservoir 120.

In one embodiment, the recesses 122, 152 may be sealed with a film-like material. As the reservoir 120 is coupled to the body 110, the extensions 126, 156 may puncture and pierce the film-like materials thereby allowing fluid communication between the body 110 and the reservoir 120. Incorporating the film-like material for sealing the recesses 122, 152 may allow the reservoir 120 to be offered as a one-time use consumable reservoir which is replaced when the additive is exhausted.

As discussed above, the second substance from the reservoir 120 may be in fluid communication with the chamber 114 via the second pathway 128. In one embodiment, the first extension 126 and the first recess 122 may be part of the second pathway 128. In other words, the second substance, stored in the reservoir 120, may travel up and through the first extension 126 via the first recess 122, and out and into the chamber 114 via a nozzle 124 as best seen in FIG. 9. It will be appreciated by one skilled in the art that the first extension 126 and the nozzle 124 may be in fluid communication and that part of the second pathway 128 may be substantially embedded within the body 120 as identified in FIG. 8.

The aperture 150 on the body 110 may be in fluid communication with the reservoir 120 to allow for venting. In one embodiment, the second extension 156 and the second recess 152 may be part of the fluid pathway between the aperture 150 and the reservoir 120. In other words, air may enter the aperture 150, through the second extension 156 and the second recess 152, and into the reservoir 120. In operation, as the second substance leaves the reservoir 120 and travels into the chamber 114, air may enter the reservoir 120 through the aperture 150 to relieve the suction pressure within the reservoir.

In one embodiment, the steam appliance may include a steam generation unit and a steam conduit attachable to the steam generation unit for guiding steam, and a steam applicator attachable to the steam conduit. The steam applicator may be substantially similar to the attachment device 100 as described herein.

For example, the steam applicator may include an outlet, a chamber adjacent the outlet, an inlet in fluid communication with the chamber via a first pathway, the inlet capable of receiving steam from the steam conduit, and a reservoir in fluid communication with the chamber via a second pathway. The reservoir may be configured to store an additive. In some embodiments, the additive may be at least one of disinfectant cleaner, bleach solution, antimicrobial solution, sanitizing solution, cleaning solution or combinations thereof. In other embodiments, the additive may be a composition that is suitable at destroying a wide variety of bacteria, yeasts, fungi, spores, mold and mildew, among other viruses and microbes.

In operation, as steam from the steam conduit enters the inlet, through the first pathway, and passes through the chamber, a reduced pressure is generated in the chamber which is capable of drawing the additive into the chamber so as to discharge a composition via the outlet, the composition being a mixture of steam and the additive. The composition may be applied to various for cleaning purposes, for example, carpets, kitchen countertops, marble, tile, hardwood floors, laminate, and others suitable surfaces.

Figure 13:
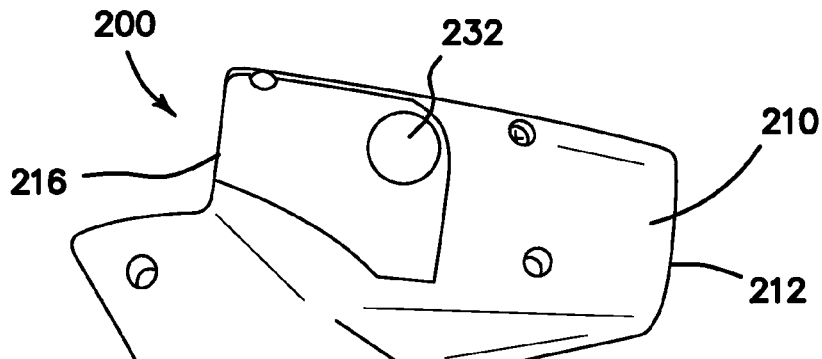
FIG. 13 is a perspective view of an attachment device according to one embodiment of the present disclosure.
Figure 14:
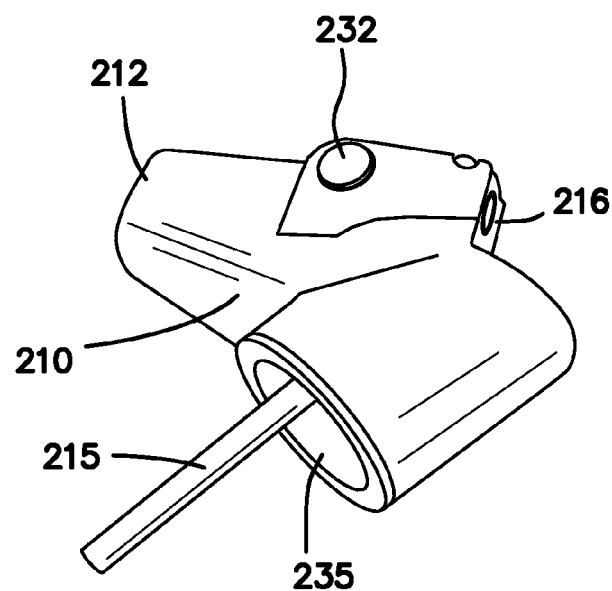
FIGS. 14-15 are perspective views of the body and the reservoir, respectively, of the attachment device of FIG. 13.
Figure 15:
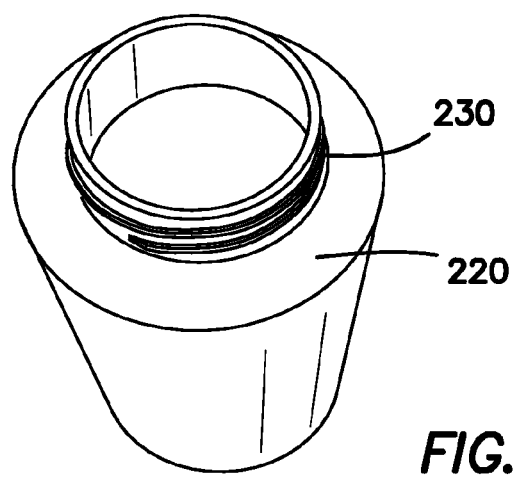

Reference is now made to FIGS. 13-15 showing perspective views of an attachment device 200 according to one embodiment of the present disclosure. The attachment device 200 may be substantially similar to the attachment device 100 discussed above including having a body 210 that may be coupled to a reservoir 220. The body 210 includes an inlet 216 for receiving steam from a steam appliance and an outlet 212 for discharging a mixed composition of steam and additive, the additive being from the reservoir 220. As described above in other embodiments, the steam appliance may be securely coupled to the inlet 216 using a mechanical latch and releasable via a pair of release buttons 232.

In one embodiment, the reservoir 220 may be coupled to the body 210 using threads, with the reservoir 220 having one of male threads 230 or female threads 235, and the body 210 having the corresponding other of the male and female threads. Of course the reservoir 220 may be attached to the body 210 in any suitable manner.

In one embodiment, the substance or additive within the reservoir 220 may be in fluid communication with the mixing chamber via a tube 215 as shown in FIG. 14. When the reservoir 220 is securely attached to the body 210, the tube 215 may extend substantially downwardly from the body 210 and into the reservoir 220 to provide a fluid pathway for the substance or additive to travel into the mixing chamber from the reservoir 220. Because the reservoir 220 is detachable from the body 210, the substance or additive in the reservoir 220 may be replenished as necessary. In some instances, different substances, additives or mixtures thereof may be utilized.

Although the disclosure has been described in detail with reference to several embodiments, for example, specific dimensions in terms of orifice diameter, spacing, and angle of the inlet/outlet, it will be appreciated by one skilled in the art that other embodiments may be used, and adjustments may be made to one or more of the variables described herein to adjust the flow rate of the additive and/or the steam. Additional variations and modifications exist within the scope and spirit of the disclosure as described and defined in the following claims.

What is claimed is:

1. An apparatus comprising:
    (a) a member having
    an inlet configured to receive steam from a steam appliance, and
    a first pathway in fluid communication with the inlet;
    (b) a housing configured to receive the member, the housing having
    a chamber in fluid communication with the first pathway; and
    (c) a reservoir in fluid communication with the chamber via a second pathway, the reservoir configured to hold an additive;
    wherein the housing is configured such that when the member is inserted into the housing by a first distance, additive is drawn into the chamber from the reservoir at a first rate as steam passes through the chamber, and when the member is inserted into the housing by a second distance, additive is drawn into the chamber from the reservoir at a second rate, different from the first rate, as steam passes through the chamber.

2. The apparatus of claim 1, wherein the second rate is greater than the first rate.

3. The apparatus of claim 1, further comprising vents formed about portions of the member to mitigate turbulence inside the chamber.

4. The apparatus of claim 1, wherein the additive comprises at least one of a disinfectant cleaner, a bleach solution, an antimicrobial solution, and a sanitizing solution.

5. The apparatus of claim 1, in combination with the steam appliance, the steam appliance including a handheld steam unit.

6. The apparatus of claim 1, wherein:
    one of the member and the housing includes a first tab and a second tab, and the other of the member and the housing includes a detent configured to receive the first and second tabs; and
    when the member is inserted into the housing by the first distance, the detent engages with the first tab, and when the member is inserted into the housing by the second distance, the detent engages with the second tab.

* * * * *